July 15, 1969
D. DANIELS
3,455,109
HYDRAULIC TRANSMISSION DEVICE
Filed Nov. 20, 1967
2 Sheets-Sheet 1
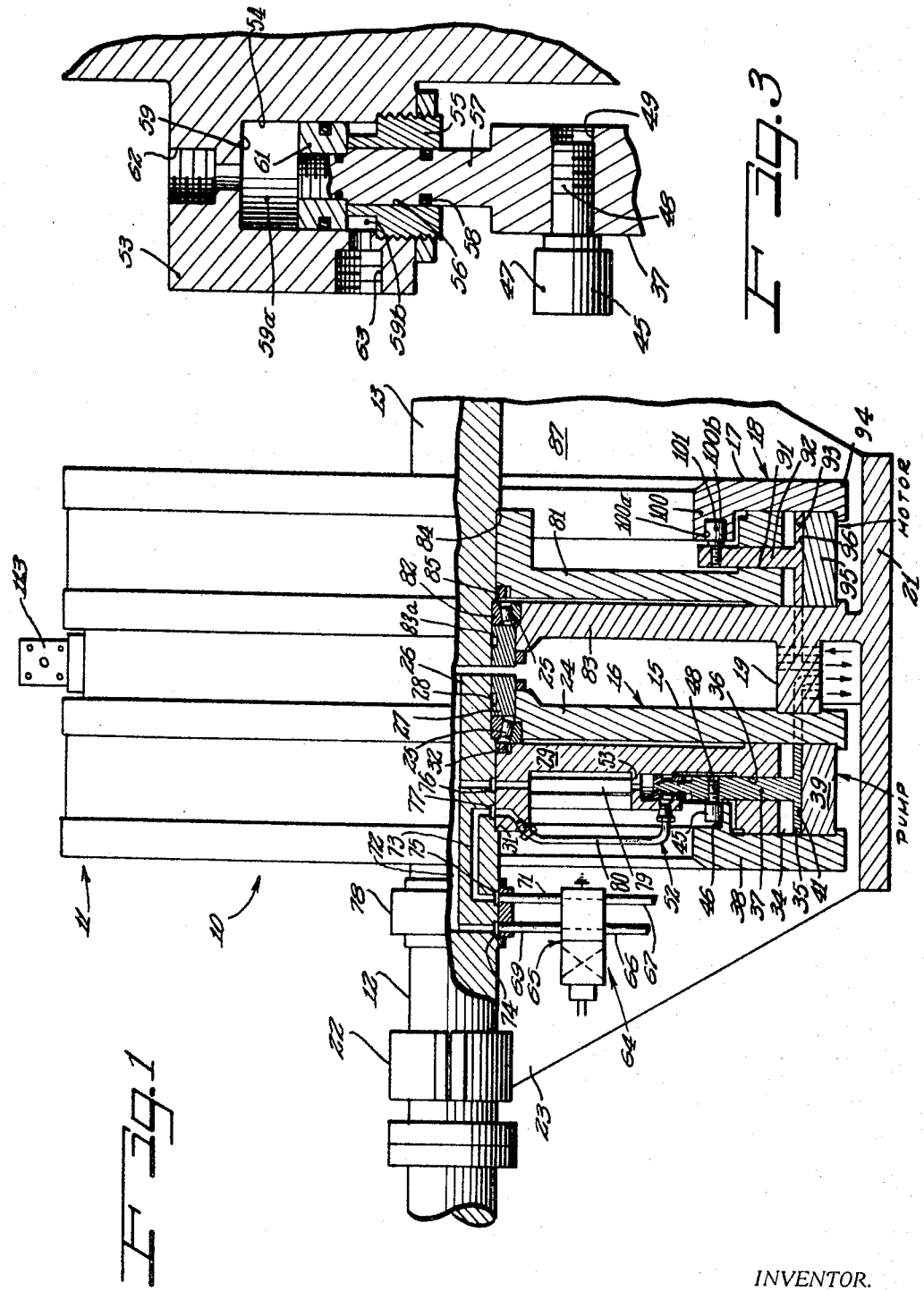
INVENTOR.
Dennis Daniels
BY Hill, Sherman, Meroni, Gross + Simpson ATTORNEYS

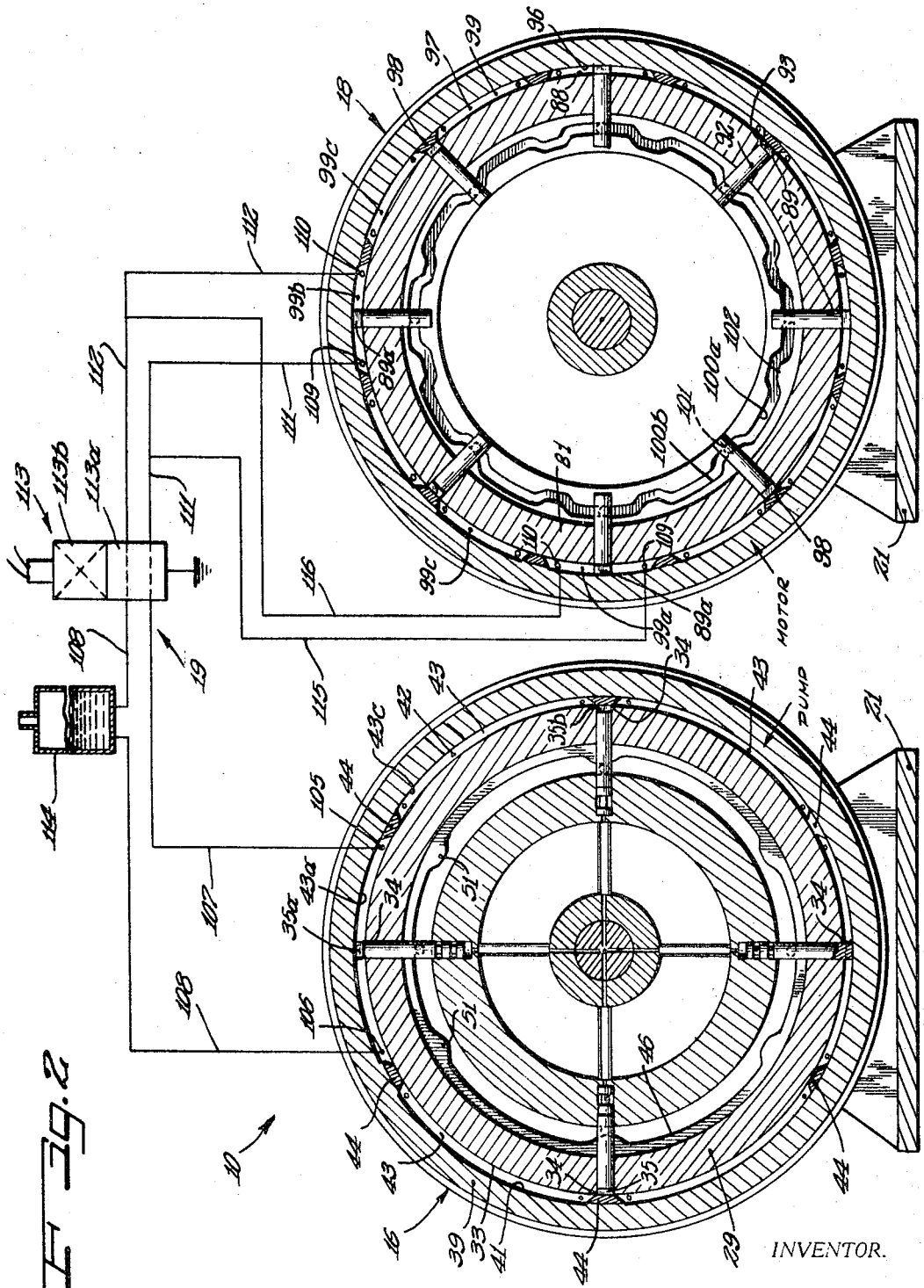

United States Patent Office 3,455,109
Patented July 15, 1969

3,455,109
HYDRAULIC TRANSMISSION DEVICE
Dennis Daniels, Williamsville, N.Y., assignor of forty-nine percent to E. B. Trottnow Machine Specialties Inc., Tonawanda, N.Y., a domestic corporation
Continuation-in-part of application Ser. No. 667,236, Sept. 12, 1967. This application Nov. 20, 1967, Ser. No. 684,156
Int. Cl. F16h 39/24; F01c 1/04
U.S. Cl. 60—53    7 Claims

ABSTRACT OF THE DISCLOSURE

A hydraulic transmission with a fixed ratio between the input and output speeds having a forward, neutral and reverse drive and including a hydraulic pump and a hydraulic motor interconnected by hydraulic fluid transmission lines. Both the pump and motor include a rotor coacting with a stator each of which has a concentric cylindrical surface to form an annular space about the rotor which is divided into working chamber segments by fixed abutments on the stator. The rotor has abutments moving into and out of the chambers. The pump has a pressure control system which selectively retracts the abutments of the rotor to provide the pump with both a pumping and a nonpumping mode of operation to provide the transmission with a drive and a neutral condition. The transmission lines include valve means to select the input ports of the motor so that the direction of rotation of the motor may be selectively changed. The ratio between the input and the output of the transmission is determined by the ratio in the annular length of the respective working chambers of the motor and pump.

CROSS-REFERENCES TO RELATED APPLICATION

The invention is a continuation-in-part of my copending application, entitled "Retractable Vane Hydraulic Motor Pump Device," Ser. No. 667,236, filed Sept. 12, 1967.

BACKGROUND OF THE INVENTION

Field of the invention

This invention pertains to a hydraulic transmission utilizing a retractable vane hydraulic pump coacting with retractable vane hydraulic motor.

Prior art

Transmission devices which are presently available utilize meshing gears to obtain a reduction in speed and to change the direction of rotation between the input and output shafts. Since transmissions also require a clutch member which uses friction surfaces, they experience slippage losses in the clutch especially when subjected to a high torque load. The meshing gears involve metal-to-metal contact which creates wear between the teeth of the gears and which produces noises which are undesirable in certain applications such as a marine transmission.

SUMMARY OF THE INVENTION

The present invention provides a hydraulic transmission utilizing a retractable vane-type hydraulic pump which drives a hydraulic motor by the flow of fluid through hydraulic transmission lines. The hydraulic pump comprises a rotor having a cylindrical surface in which radially movable abutments are circumferentially spaced and which is disposed in a stator having a concentric cylindrical surface with fixed abutments circumferentially spaced thereon. The pump further includes a clutch means which selectively retracts the movable vanes so that the pump may operate in a nonpumping mode as well as a pumping mode. The hydraulic transmission lines include valve means which allow the selection of the inlet ports for the hydraulic motor so that the motor may be rotated in either the clockwise or counterclockwise direction. The capacity of the pump and motor are so selected that a fixed ratio between the input speed to the transmission and the output speed of the transmission is obtained.

Accordingly, it is an object of the present invention to provide a hydraulic transmission capable of a forward, neutral and reverse drive.

Another object of the present invention is to provide a hydraulic transmission having a fixed ratio between the input and output speeds.

A still further object of the present invention is to provide a hydraulic transmission capable of handling a high torque capacity without slippage in the clutch mechanism of the transmission.

Yet another object of the present invention is to provide a hydraulic transmission which eliminates metal-to-metal contact while obtaining a reduction in speeds or a reversal of direction between the input shaft and the output shaft.

Many other advantages, features and additional objects of the present invention will become manifested to those versed in the art upon making reference to the detailed description and the accompanying sheets of drawings in which a preferred structural embodiment incorporating the principles of the present invention is shown by way of illustrative example.

Description of the drawings

FIG. 1 is a fragmentary view of the hydraulic transmission with portions in section for purposes of illustration;

FIG. 2 is a diagrammatic view illustrating the relationship between the hydraulic pump and motor and the fluid transmission means therebetween; and FIG. 3 is an enlarged view of the double acting hydraulic piston illustrated in FIG. 1.

Description of the preferred embodiments

Referring to FIG. 1 a hydraulic transmission embodying the improvements of this invention is illustrated and generally indicated at 10 and comprises a housing generally indicated at 11 having an input shaft 12 and an output shaft 13.

The housing 11 comprises casing portions which are identified as the stator 15 for the hydraulic pump generally indicated at 16 and the stator 17 for the hydraulic motor generally indicated at 18. The stators 15 and 17 are interconnected by a manifold ring 19 which contains the fluid conduit means extending between the hydraulic pump 16 and the motor 18. The housing 11 further includes a base 21 which supports the housing on any foundation or supporting surface in the vehicle or vessel using the transmission 10.

The input shaft 12 is supported for rotation in the housing 15 of the pump 16 by a pillow block bearing 22 which is supported on the base 21 by an upright frame member 23. To support an end 26 of the input shaft 12 in the pump housing 15, an inner side wall 24 is provided with bearing means 25 which may be a conventional bearing such as the roller bearings supporting the shaft end 26. To prevent the axial movement of the shaft 26 in the housing 15 a hub nut 27 having sealing means 28 is provided. Mounted on the input shaft 12 is a rotor 29. To prevent axial movement of the rotor 29 on the shaft 12, the shaft has a shoulder 31 on which the rotor is held against by an annular ring 32 which is threaded on the shaft 12. To prevent relative rotation between the rotor 29 and the shaft 12 a key (not illustrated) is provided.

As best illustrated in FIG. 2, the rotor 29 has a cylindrical peripheral surface 33 with four circumferentially spaced grooves 34 for receiving retractable vanes or abutments 35. As best illustrated in FIG. 1, each of the grooves 34 has a radially extending bore 36 which receives a shaft portion 37 of the retractable vane 35.

Then stator 15 is composed of the inner side wall 24, an outer side wall 38 and an annular ring 39 held together in sealing engagement by suitable means such as bolts (not illustrated). The annular ring 39 has a cylindrical surface 41 which is concentric to the periphery 33 of the rotor 29. Referring to FIG. 2, the surfaces 41 and 33 are concentrically spaced from each other to form an annular space 42 which is partitioned into segmented working chambers 43 by six fixed abutments or vanes 44 equally spaced circumferentially about the surface 41. To insure that the working chambers are fluid-tight, the stator 15 and rotor 29 are provided with sealing means on their coacting surfaces such as the sealing means illustrated in the above noted copending application. To allow the passing of the retractable abutment 34 by the fixed abutment 44 as the rotor 29 revolves in the housing 15, the shafts 37 of the retractable abutments 35 are provided with a cam follower 45 which follows a single acting cam surface 46 provided on the front side wall 38 of the housing 15. As illustrated in FIGS. 1 and 3, the follower 45 comprised of a roller 47 which revolves about a threaded shaft 48 which is received in a threaded bore 49 in the abutment shaft 37. The cam means 46 is provided with a surface having six equally spaced cam portions 51 which are in radial alignment with the fixed abutments 44. Thus, when each of the retractable abutments 35 approaches a fixed abutment 44, the cam follower 45 contacts the raised cam portions 51 to cause the retraction of the abutment 35 and allow the movement of the abutment past the fixed abutment 44.

The fixed abutments 44 are in sealing contact with the peripheral surface 33 of the rotor 29 whereas the retractable abutments 35 when in the extended position are in sealing contact with the cylindrical surface 41. The movement of the retractable abutments 35 through the working chambers 43 causes fluid entrapped therein to be pumped out of the chambers through port means which will be discussed hereinafter. This pumping of the hydraulic fluid is similar to that disclosed in my copending application mentioned hereinabove.

To provide for the selective retraction of the retractable abutments 35 so that the hydraulic pump 16 may operate in a nonpumping or a free wheeling mode, a clutch means generally indicated at 52 is provided. As best illustrated in FIG. 3, the rotor 29 has an annular projection 53 which has a cylindrical bore 54 radially aligned with each of the bores 36 of the retractable abutments 35. The bore 54 is closed at one end by a threaded member 55 having an axial bore 56. The shaft 37 of the retractable abutment means at an end opposite the abutment has a reduced portion 57 which is slidably received in the bore 56 and sealed with the bore 56 by a sealing means 58 such as an O-ring disposed in an annular groove to form a fluid-tight chamber 59 in the enclosed portion of the bore 54. Attached to the end of the reduced portion 57 is a double acting piston 61 having sealing engagement with the walls of the chamber 59 and dividing the chamber 59 into two portions 59a and 59b. The chamber 59 has a first port means 62 in communication with portion 59a and a second port means 63 in communication with portion 59b so that fluid entering the chamber portion 59a through the port means 62 causes the piston 61 to be forced radially outward whereas fluid entering the chamber portion 59b through the port means 63 forces the piston radially inwardly. The movement of the piston 61 thus reciprocates the retractable abutment 35 between an extended position and a retracted position.

To supply fluids to the chambers to actuate the piston 61, the clutch means 52 has a controlled or pilot fluid system indicated at 64 comprising a source of control or pilot fluid from a pilot pump, a control valve means 65 and conduits or passageways extending from the control valve 65 to the chamber 59. A conduit 66 conveys a control fluid from the control or pilot pump to the valve means 65 while a conduit 67 is an outlet for the control fluid to return to a reservoir for the control fluid pump. The valve means 65 comprises a four way solenoid valve which is diagrammatically illustrated in FIG. 1 and allows the transfer of the fluid pressure in the conduit 66 selectively to a conduit 69 or 71.

To convey the fluid in the conduit 69 or 71 to the port means 62 and 63, respectively, the shaft 12 is provided with fluid passageways 72 and 73 which intercept grooves 74 and 75, respectively, in one portion of the shaft and grooves 76 and 77 on a portion of a shaft receiving the rotor 29. To transfer the fluid between the conduits 69 and 71 to the grooves 74 and 75, respectively, the conduits are provided with an annular fluid-tight sleeve 78 overlying the grooves 74 and 75. The sleeve 78 is held stationary with respect to the rotating shaft 12 and is supported by the upright member 23 of the housing base 21. The groove 76 is in communication with four passageways 79 in the rotor 29 which conveys the fluid from the grooves 76 to the port means 62 of each of the four chambers 59a whereas the grooves 77 are in communication with four passageways or conduits 80 of the rotor 29 which convey the fluid from the groove 77 to each of the ports 63.

To apply a pressure through the ports 62 to the chambers 59a, the solenoid or the valve means 65 is set to interconnect the conduit 66 with the conduit 69 so that the pressure control fluid flows through the passageways 72 and 79 to the port 62. While so connected fluid entrapped in the chamber portions 59b is forced out of the port means 63 through the passageways 80, 73, 71 to the conduit 67 which transfers the fluid to the tank or reservoir for the source of control fluid. With the valve 65 in the above described position, the pilot or control fluid acts on the piston 61 and biases or urges the retractable vanes 35 in an outward direction, with the inward movement being controlled strictly by the cam means 46.

To obtain a nonpumping mode or neutral position for the pump 16, the valve means 65 is positioned so that the control fluid flows from the conduit 66 into the conduits 71, 73, 80 to the port 63 to force the pistons 61 radially inward to retract the abutments 35. While in this arrangement, the fluid which had previously entered the portions 59a is expelled or exhausted to the reservoir tank through the conduits or passageways 79, 72, 71 and 67. While the control fluid pressure is introduced to the chamber portions 59b via the port 63, the piston 61 holds the vane 35 in a retracted position and counteracts any forces developed by the rotation of the rotor which would tend to urge or force the vane to its outward position.

The hydraulic motor 18 has a similar structure for the housing 17 and the rotor 81. The rotor 81 is mounted for rotation on an output shaft 13 which is supported in the housing 18 by a bearing means 82 which is carried by a side plate 83 of the housing 17. To prevent the axial movement of the shaft 13 in the bearing means 82 a hub nut 83a is provided. To prevent the rotor 81 from axial movement along the shaft 13, a shoulder 84 is provided in which the rotor is held against by an annular ring 85 which may be threaded on the shaft 13. To support the outer end of the shaft 13, a pillow block bearing similar to bearing 22 is supported on an upright portion 87 of the base 21 of the transmission 10.

The rotor 81 has a cylindrical surface 88 (FIG. 2) and a series of grooves 89 are provided therein in equally spaced circumferentially along the peripheral surface 88. Each of the grooves 89 has an axial radially extending bore 91 in which a shaft portion 92 and movable abutment 93 is slidably received in a sealing engagement.

The housing 17 comprises the side plate 83 and a side plate 94 with an annular ring member 95 extending therebetween. The ring member 95 has a concentric cylindrical surface 96 which is concentrically spaced from the surface 88 to define an annular spacing 97 which is partitioned by a series of abutments 98 which are spaced circumferentially about the surface 96 to form a corresponding plurality of working chambers 99.

To reciprocate the movable abutment 93 to allow clearance past the fixed abutments 98, the slide plate 94 is provided with a cam means 100 which as illustrated has a double acting cam surface 100a and 100b which form a groove in which a cam follower 101 attached to the shaft 92 on the movable abutment 93 travels. The cam surface 100b has a high point 102 in radial alignment with each of the fixed abutments 98 and the cam surface 100a has a complementary depression. The surface 100a acting on the cam follower 101 holds the abutment 93 in an extended position until the follower contacts the high point 102 which causes the follower to radially retract the abutment 93.

The motor housing 17 has sealing means which coact with the rotor 81 to provide a fluid-tight seal for the annular space 97 and the working chambers 99. As illustrated in FIG. 2, the fixed abutments 98 are in sealing engagement with periphery 88 of the rotor 81 whereas the extended movable abutments 93 are in a sealing engagement with the cylindrical wall 96 while the abutments are passing through the working chambers 99.

To provide for the removal of the fluid pumped in each of the working chambers 43 of the pump 16, each of the chambers 43 has an outlet port 105 which is interconnected by fluid passageways to the passageway system 19. To supply fluid to the working chambers 43 each of the chambers has an inlet port 106. As best illustrated in FIG. 2, the ports 105 and 106 are disposed in the side wall 15 adjacent each one of the fixed abutments 44. If the pump is to be rotated clockwise the outlet ports of each chamber 43 are positioned adjacent the counterclockwise side of the abutment whereas the inlet ports 106 are positioned on the clockwise side. Thus, as the vane 34 passes through the working chamber 43 fluid is forced out of the outlet port 105 and replacement fluid is drawn in the chamber as the vane moves away from the inlet port 106. The port 105, as diagrammatically illustrated in FIG. 2, is in communication with the passageway 107 while the port 106 is in communication with the fluid passageway 108. Each of the ports 105 and 106 are provided with a passageway 107 and 108, respectively, and the six passageways 107 and six passageways 108 are contained in the fluid conduit or manifold 19.

To provide for the introduction and removal of fluid into working chamber 99 of the hydraulic motor 17, each chamber 99 is provided with a first port 109 and a second port 110 which are positioned in the side wall 83 adjacent the abutments 98. The ports 109 and 110 are positioned at opposite ends of the segmented working chamber 99. Each of the first ports 109 is connected to a first conduit or passageway means 111 while each of the second ports 110 are each connected to a second passageway or conduit means 112. The conduit means 111 and 112 extend through the side wall 83 and into the conduit passageway means or manifold 19.

To provide for reversing the rotation of the hydraulic motor 18, the fluid manifold 19 is provided with a valve means 113, comprising six solenoid valves such as the one illustrated in FIG. 2. Each of the conduit passageways 107 and 108 extend to a solenoid valve means 113 and the passageways 111 and 112 are interconnected to the solenoid valve means. The solenoid valve has a valve portion 113a which interconnects the passageway 107 with the passage 111 and the passage 108 to the passage 112. When the valve is actuated so that a valve portion 113b is fitted in between the passageways, the passageway 107 becomes connected to the passageway 112 and the passageway 111 is interconnected with the passageway 108. Since the fluid pressure is being conveyed from the hydraulic pump by the passageway 107, when the valve portion 113a is in position as illustrated the hydraulic fluid flows through the first passageway 111 of the motor and enters the working chambers 98 through the port 109 to cause a clockwise rotation as illustrated in FIG. 2. When the solenoid valve has been energized, the portion 113b interconnects the conduit 107 to the passageway 112 and the fluid under pressure enters the second port 110 to cause a rotation of the rotor 81 of the motor 18 in a counterclockwise direction.

To provide for leakages that may occur in the various conduit means, a reservoir 114 is provided in the return lines or passageways 108. The reservoir 114 may be a low pressure preloaded accumulator so as to facilitate the flow of hydraulic fluid in the passageways 108 into the chambers 43 of the pump 16.

For the transmission 10 to obtain a reduction in speed between the input shaft 12 and the output shaft 13, the rotary device comprising the pump 16 has the same fluid capacity as the rotary device comprising the motor 18; however, the angular displacement of the rotor 81 is less than the angular displacement of the rotor 29 for an equal volume of the hydraulic fluid. This is accomplished by changing the angular length of the working chambers 99 to be less than the annular length of the segmental working chambers 43. As illustrated the rotor of the motor 18 has eight retractable vanes whereas the rotor of the pump 16 has four retractable vanes. Each of the first and second passageway means 111 and 112, respectively, are arranged to have branches 115 and 116, respectively, so that all twelve first ports and twelve second ports are in communication with the manifold 19. Thus, the fluid being pumped through a single port 105 is diverted to two of the twelve working chambers 99 as illustrated. The volume of the two chambers 99 is equal to the volume of the working chamber 43, however, the rotor 81 is moved only half the angular distance by the fluid from one of the chambers 43 of the pump 16.

As illustrated, the branch 115 of the first passageway means 111 is in communication with a working chamber 99a which is angularly displaced 90° from the chamber 99b of which the first passageway means 111 is connected. Thus, the pump abutment 35a is pumping fluid which acts against the motor abutments 89a, 89a. The next adjacent working chamber 43c is interconnected to the two chambers 99c, 99c of the motor 18. The remaining working chambers 43 of the pump are interconnected to corresponding working chambers 99 in the motor which are arranged similarly to those described hereinabove.

The eight vane motor which is driven by a four vane pump develops a speed reduction in the ratio of two to one or mathematically the reduction of the speed ratio is $m/t:1$ where $m$ equals the number of movable abutments of the motor and $t$ equals the number of movable abutments of the pump.

It has been found that the transmission 10 works best when $m=nt$ where $n$ is a whole number.

In other words, the transmission 10 can obtain a two to one reduction when the motor has eight retractable vanes and is driven by a four retractable vane pump and a three to one ratio when a four retractable vane pump drives a twelve retractable vane motor. This is because a pump using four retractable vanes working in six chambers develops a balancing of the forces on the rotor which reduces vibrations and wear on the bearings of the pump. Hydraulic motors have a multiple of the four and six combination if retractable vanes in chambers also obtain the balances of the forces on the rotor.

The location of the ports such as the inlet ports 106 and the outlet ports 105 adjacent to the surfaces of the fixed abutments 44 in the pump permits the movable abutment 35 to close the ports at the time in which fluid leakage therebetween would be critical. The same location with respect to the ports 109 and 110 allows the movable abutments 89 of the motor to close the ports in a similar manner.

To operate the transmission 10, a rotational force is applied to the input shaft 12 which drives the pump 16 to convert the rotating force into a fluid pressure. The fluid pressure drives the motor 18 which converts the pressurized fluid into a rotational movement in the output of the drive shaft 13.

To change the direction of rotation of the drive shaft 13 of the transmission 10, the pump means 16 is placed in the free wheeling or neutral mode by activating the solenoid valve means 65 of the clutch means 52 to retract the abutments 35 of the pump 16. Then the six solenoid valves 113 are energized to change the connection between the fluid passageways 107, 108 and first and second passageways 111 and 112. Once the connection of the passageways has been completed, the solenoid 65 of the clutch means 52 is de-activated to allow the radial extension of the movable abutments or vanes 35 of the pump means 18 to extend into the chambers 43 and place the pump in a connecting or pumping mode.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A transmission comprising in combination:
   a pump means for converting rotary motion into a flow of pressurized fluid, said pump means comprising, inner and outer relatively rotatable parts together with one another forming a circumferentially continuous annulus having concentrically spaced inner and outer walls,
      fixed abutment means on one of said parts extending into said annulus to divide said annulus into a plurality of working chamber segments of equal size and shape,
      said one of said parts having inlet and outlet port means associated with each of said segments for conveying pressurized fluid to and from said segment,
      movable abutment means on the other of said parts for moving through said annulus said movable abutment means comprising relatively rotatable cam means for reciprocating said movable abutment means radially to clear said fixed abutment means, and clutch means for controlling radial reciprocation of said movable abutment means to allow selective relative rotation of said inner and outer parts in both a converting and a free-wheeling mode of operation,
   whereby said parts rotating in a free-wheeling mode develop substantially zero fluid pressure;
   a motor means for converting a flow of pressurized fluid into rotary motion, said motor means having first port means for receiving pressurized fluid and second port means for discharging a hydraulic fluid; and
   conduit means interconnecting said ports of said pump means to said ports of said motor means, one portion of said conduit means connecting said outlet ports of said pump means to the first port means, the remaining portion of conduit means interconnecting said inlet ports of said pump to said second port means of said motor means, whereby fluid pressure developed in said pump means is introduced through said first port means to drive said motor means.

2. A transmission according to claim 1, which includes means to control the direction of rotation of said motor means.

3. A transmission according to claim 2, wherein said means to control the direction of rotation comprises
   a valve means disposed in said conduit means, said valve means selectively interconnecting said outlet port means of said pump means to both said first and second port means of said motor means,
   whereby the selective interconnection to either the first or second port means changes the direction of rotation of said motor means.

4. A transmission according to claim 1, wherein said motor means comprises
   inner and outer relatively rotatable parts together with one another forming a circumferentially continuous annulus having concentrically spaced inner and outer walls,
   fixed abutment means extending radially through said annulus and spaced circumferentially to partition said annulus into a plurality of working chamber segments of equal size and shape, and
   movable abutment means for movement through said annulus in response to relative rotation of said inner and outer parts, said movable abutment means including a rotatable cam means for reciprocating said movable abutment means radially to clear said fixed abutment means.

5. A transmission according to claim 4, wherein the number of movable abutment means of said motor means is greater than the number of movable abutment means for said pump whereby the speed reduction in said transmission is a ratio proportional to the ratio between the movable abutments of said pump and said motor.

6. A transmission according to claim 5, wherein the number of movable abutments in said motor is equal to a whole number multiple of the number of movable abutments in said pump.

7. A transmission according to claim 6, wherein said outlet passageway of said pump means supplies fluid to a plurality of said first port means of said motor, said plurality being equal to said multiple.

References Cited

UNITED STATES PATENTS

| | | | |
|---|---|---|---|
| 130,300 | 8/1872 | Jungling | 91—74 |
| 215,314 | 5/1879 | Berger | 91—74 |
| 560,252 | 5/1896 | Bennett | 91—74 |
| 693,348 | 2/1902 | Dearing | 91—74 |
| 1,536,737 | 5/1925 | Williams | 91—74 |
| 2,362,389 | 11/1944 | Martin | 60—530 |
| 2,515,288 | 7/1950 | Barrett | 60—530 XR |

EDGAR W. GEOGHEGAN, Primary Examiner

U.S. Cl. X.R.

91—74; 103—123, 136